(12) United States Patent
Cho et al.

(10) Patent No.: US 10,726,787 B2
(45) Date of Patent: Jul. 28, 2020

(54) CHIP ON FILM AND DISPLAY DEVICE INCLUDING THE SAME

(71) Applicant: LG Display Co., Ltd., Seoul (KR)

(72) Inventors: Soon-Dong Cho, Gumi-si (KR); Jae-Won Han, Goyang-si (KR); Jun-O Hur, Daegu (KR); Dong-Ju Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/213,907

(22) Filed: Dec. 7, 2018

(65) Prior Publication Data

US 2019/0189058 A1    Jun. 20, 2019

(30) Foreign Application Priority Data

Dec. 15, 2017    (KR) .......................... 10-2017-0173219

(51) Int. Cl.
  *G09G 3/3258*    (2016.01)
  *G09G 3/3291*    (2016.01)
  *G09G 3/3275*    (2016.01)
  *G09G 3/3266*    (2016.01)
  (Continued)

(52) U.S. Cl.
  CPC ......... *G09G 3/3258* (2013.01); *G09G 3/3266* (2013.01); *G09G 3/3275* (2013.01); *G09G 3/3291* (2013.01); *G09G 3/3677* (2013.01); *G09G 3/3688* (2013.01); *G02F 2001/13456* (2013.01); *G09G 2300/0408* (2013.01); *G09G 2310/027* (2013.01); *G09G 2310/0286* (2013.01); *G09G 2310/0297* (2013.01)

(58) Field of Classification Search
  CPC ... G09G 2310/0297; G09G 2300/0426; G09G 2310/0262; G09G 2300/0408; G09G 2300/0804; G09G 3/3685; G09G 3/3266; G09G 2310/0286; G09G 3/3291; G09G 3/3648; G09G 3/3225; G09G 3/3275; G09G 3/2092; G09G 2310/0291; G02F 1/133305; G02F 1/133308; G02F 1/13458; G02F 1/13454; H01L 27/3276; H01L 51/0097; H01L 27/3244
  See application file for complete search history.

(56) References Cited

U.S. PATENT DOCUMENTS 9,633,589 B2 * 4/2017 Kim .......................... G09G 3/20
10,225,963 B2 * 3/2019 Lee .................... G02F 1/133305
(Continued)

*Primary Examiner* — Sanjiv D. Patel
(74) *Attorney, Agent, or Firm* — Fenwick & West LLP

(57) ABSTRACT

A chip on film and a display device including the same selectively outputs gate transmission signals and data outputs to reduce the number of output pads in a data driving IC. The COF includes first to third groups of data input pads, gate input pads, and output pads. A data driving IC includes first to third groups of output buffers, a first switchable output unit configured to selectively supply gate transmission signals and an output of the first group of output buffers to the first group of output pads, and a second switchable output unit configured to selectively supply the gate transmission signals and an output of the third group of output buffers to the third group of output pads. An output of the second group of output buffers is supplied to the second group of output pads between the first and the third groups of output pads.

16 Claims, 7 Drawing Sheets

(51) Int. Cl.
*G09G 3/36* (2006.01)
*G02F 1/1345* (2006.01)

(56) References Cited

U.S. PATENT DOCUMENTS

| | | | |
|---|---|---|---|
| 2010/0002180 A1* | 1/2010 | Kim | G02F 1/13452 |
| | | | 349/143 |
| 2010/0238148 A1* | 9/2010 | Sah | G09G 3/36 |
| | | | 345/206 |
| 2014/0132873 A1* | 5/2014 | Ogasawara | G02F 1/13452 |
| | | | 349/43 |
| 2017/0032731 A1* | 2/2017 | Shim | G09G 3/3677 |
| 2017/0069280 A1* | 3/2017 | Xu | G09G 3/20 |
| 2017/0116910 A1* | 4/2017 | Miao | G09G 3/2092 |
| 2017/0332495 A1* | 11/2017 | Kim | H05K 1/111 |
| 2017/0358520 A1* | 12/2017 | Song | G02F 1/133 |
| 2019/0049805 A1* | 2/2019 | Chen | G09G 3/20 |
| 2019/0057658 A1* | 2/2019 | Nie | G09G 3/3266 |
| 2019/0150329 A1* | 5/2019 | Lee | G02F 1/133305 |
| | | | 361/679.01 |

* cited by examiner

CHIP ON FILM AND DISPLAY DEVICE INCLUDING THE SAME

CROSS-REFERENCE TO RELATED APPLICATION

This application claims the benefit of Republic of Korea Patent Application No. 10-2017-0173219, filed on Dec. 15, 2017, which is hereby incorporated by reference as if fully set forth herein.

BACKGROUND

Technical Field

The present disclosure relates to a chip on film and a display device including the same, for selectively outputting gate transmission signals and data outputs to reduce the number of output pads in a data driving integrated circuit (IC).

Description of the Related Art

Recently, representative examples of a display device for displaying an image using digital data include a liquid crystal display (LCD) using liquid crystal, an organic light emitting diode (OLED) display using an OLED, and an electrophoretic display (EPD) using electrophoretic particles.

A gate-in-panel (GIP) type gate driver installed in a panel has been applied as a gate driver for driving gate lines of a panel. The GIP-type gate driver receives required GIP driving signals through GIP transmission lines to a chip on film (COF) with a data driving integrated circuit (IC) installed thereon from a printed circuit board (PCB).

The COF including the gate transmission lines includes N gate output pads, positioned at a left side of a circuit film, and N gate output pads, positioned at a right side of the circuit film, for compatibility. Depending on a bonding position of a COF, only N gate output pads positioned at one side of the left and right sides are connected to a panel and N gate output pads positioned at the other side are dummy pads that are not used.

However, when the number of gate transmission signals is increased, as in an OLED display device, the number of gate output pads, formed in each COF, is also increased and, thus, there is a problem in that an output pad pitch of a COF is narrowed.

When the number of output pads of a COF is increased, misalignment error may occur during a bonding process of the COF and, thus, a horizontal width of the COF is increased but there is a problem in that manufacturing costs are increased as a horizontal width of the COF is increased.

A method of additionally dividing each of two source PCBs into two pieces to overcome the misalignment error during the bonding process has been proposed but the additionally divided source PCBs need to be connected to each other through a connector and a flexible cable and, thus, there is a problem in that the number of operations in a bonding and assembly process is increased, thus increasing tact time and manufacturing costs.

BRIEF SUMMARY

In various embodiments, the present disclosure provides a chip on film (COF) and a display device including the same, for selectively outputting gate transmission signals and data outputs to reduce the number of output pads in a data driving integrated circuit (IC).

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a chip on film includes data input pads and gate input pads that are connected to a data driving integrated circuit (IC) and arranged in a first pad region of a circuit film, and first to third groups of output pads that are connected to the data driving IC and arranged in a second pad region of the circuit film, wherein the data driving IC includes first to third groups of output buffers, a first switchable output unit configured to selectively supply a plurality of gate transmission signals received from the gate input pads and an output of the first group of output buffers to the first group of output pads, and a second switchable output unit configured to selectively supply the plurality of gate transmission signals and an output of the third group of output buffers to the third group of output pads; and wherein an output of the second group of output buffers is supplied to the second group of output pads arranged between the first group of output pads and the second group of output pads.

The first switchable output unit may include a first group of multiplexers (MUXs) configured to select the plurality of gate transmission signals or select the output of the first group of output buffers in response to an enable signal and to supply the selected signals or the output of the first group of output buffers to the first group of output pads. The second switchable output unit may include a second group of MUXs configured to select the plurality of gate transmission signals or select the output of the third group of output buffers in response to a reverse enable signal obtained by inverting (e.g., reversing) the enable signal and to output the selected signals or the output of the third group of output buffers to the third group of output pads.

When the first switchable output unit selects the plurality of gate transmission signals and supplies the selected signals to the first group of output pads, the second switchable output unit may select the output of the third group of output buffers, and the second group of output buffers and the third group of output buffers may output data through the second group of output pads and the third group of output pads.

When the second switchable output unit selects the plurality of gate transmission signals and supplies the selected signals to the third group of output pads, the first switchable output unit may select the output of the first group of output buffers, and the first group of output buffers and the second group of output buffers may output data through the first group of output pads and the second group of output pads.

The data driving IC may include first to third groups of digital/analog converters (DACs) connected to the first to third groups of output buffers for respective channels, first to third groups of latches connected to the first to third groups of DACs for respective channels, and a shift register including first to third groups of stages connected to the first to third groups of latches for respective channels to supply a sampling signal, and wherein the shift register may further include a first demultiplexer (DEMUX) configured to supply a latch start pulse to a first stage of the first group of stages or a first stage of the second group of stages in response to the enable signal, and a second DEMUX configured to output a sampling signal of a last stage of the second group of stages to a next-end data driving IC as a carry output or supply the sampling signal to a first stage of the third group of stages in response to the reverse enable signal.

When the first switchable output unit supplies the plurality of gate transmission signals to the first group of output pads, the second group of stages and the third group of stages may perform a shift operation according to control of the first and the second DEMUXs to latch pixel data to the second group of latches and the third group of latches and to supply the latched pixel data to the second group of output pads and the third group of output pads through the second group of DACs and the third group of DACs, respectively.

When the second switchable output unit supplies the plurality of gate transmission signals to the third group of output pads, the first group of stages and the second group of stages may perform a shift operation according to control of the first and the second DEMUXs to latch pixel data to the first group of latches and the second group of latches and to supply the latched pixel data to the first group of output pads and the second group of output pads through the first group of DACs and the second group of DACs and the first group of output buffers and the second group of output buffers respectively.

The gate input pads may include at least one group of a first group of gate input pads positioned outside one side of the data input pads and a second group of gate input pads positioned outside another side, and the first switchable output unit may be connected to the first group of gate input pads and the second switchable output unit is connected to the second group of gate input pads or the first and the second switchable output units are commonly connected to any one group of the first group of gate input pads and the second group of gate input pads through an input terminal of the data driving IC.

In another aspect of the present disclosure, a display device includes a panel including a pixel array, first and second gate drivers connected to opposite sides of the panel to drive gate lines of the pixel array, and a plurality of chips on film in which a plurality of data driving ICs for driving data lines of the pixel array is respectively installed on a plurality of circuit films and which is connected between the panel and a printed circuit board (PCB). A first chip on film connected to the first gate driver of the plurality of chips on film and a second chip on film connected to the second gate driver may transmit a plurality of gate transmission signals using the aforementioned chip on film.

In another aspect of the present disclosure, a chip on film includes a first group of output pads, a second group of output pads, and a third group of output pads. When the first group of output pads output a plurality of gate transmission signals to be provided to a gate driver of a display device, the second group of output pads and the third group of output pads may output a plurality of data signals to be provided to a plurality of data lines of the display device. When the third group of output pads output the plurality of gate transmission signals, the first group of output pads and the second group of output pads may output the plurality of data signals.

A plurality of data input pads may receive image data, and a plurality of gate input pads may receive the plurality of gate transmission signals. The plurality of data signals may be the received image data converted to analog data signals.

The first group of output pads may output the plurality of gate transmission signals, and the second group of output pads and the third group of output pads may output the plurality of data signals in response to an enable signal.

The third group of output pads may output the plurality of gate transmission signals, the first group of output pads and the second group of output pads may output the plurality of data signals in response to a reverse enable signal, the reverse enable signal being the enable signal inverted.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Reference will now be made in detail to the preferred embodiments of the present disclosure, examples of which are illustrated in the accompanying drawings.

Figure 1:
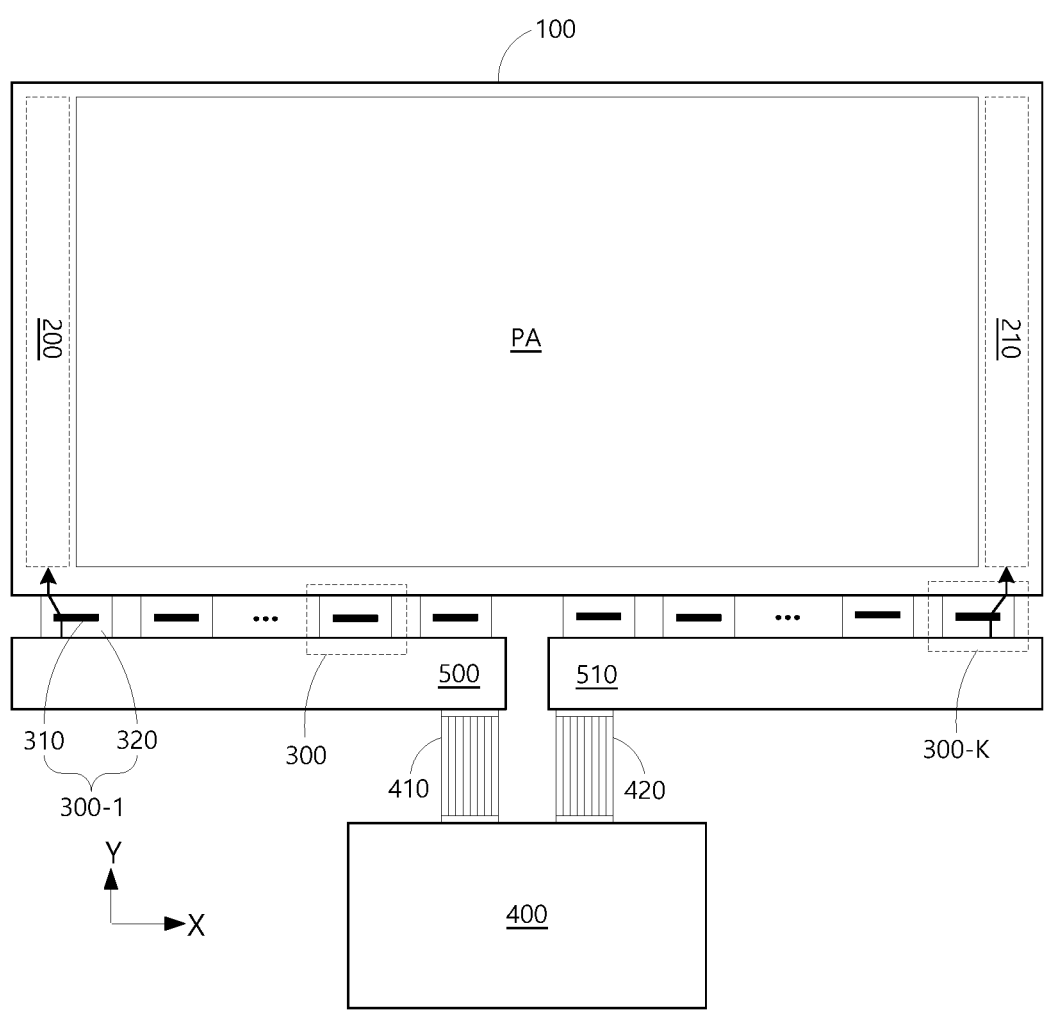
FIG. 1 is a schematic block diagram showing a configuration of a display device according to an embodiment of the present disclosure.

FIG. 1 is a schematic block diagram showing a configuration of a display device according to an embodiment of the present disclosure.

Referring to FIG. 1, the display device may include a panel 100, gate-in-panel (GIP)-type gate drivers 200 and 210, a data driver, source printed circuit boards (PCBs) 500 and 510, and so on.

The panel 100 may display an image through a pixel array PA in which subpixels are arranged in a matrix. A basic pixel may include at least three subpixels that are capable of representing white via color mixture of white W, red R, green G, and blue B subpixels. For example, the basic pixel may include subpixels of an R/G/B combination or subpixels of a W/R/G/B combination. The basic pixel may include subpixels of an R/G/B combination, subpixels of a W/R/G combination, subpixels of a B/W/R combination, and subpixels of a G/B/W combination.

The panel 100 may be various display panels such as a liquid crystal display (LCD) panel and an organic light emitting diode (OLED) panel and may be a touch panel with both a touch sensing function and a display function.

The panel 100 may include first and second GIP-type gate drivers 200 and 210 installed therein. The first and second gate drivers 200 and 210 may be positioned in first and second non-active regions of the panel 100, respectively, to drive gate lines included in the pixel array PA. The first and second gate drivers 200 and 210 may simultaneously supply gate signals at opposite ends of each gate line to reduce delay of the gate signals.

The data driver may include a plurality of chips on film (COFs) 300 in which a plurality of data driving integrated circuits (ICs) 310 is separately installed on a plurality of circuit films 320.

The plurality of COFs 300 may be connected between first and second source PCBs 500 and 510 and the panel 100. A first pad region of each of the plurality of COFs 300 may include a plurality of input pads that are bonded and connected to pad regions of the first and second source PCBs 500 and 510 through an anisotropic conductive film (ACF) using tape automated bonding (TAB). A second pad region of each of the plurality of COFs 300 may include a plurality of output pads that are bonded and connected to pad regions of the panel 100 through an ACF using a TAB method.

The first and second source PCBs 500 and 510 may be connected to a control PCB 400 through first and second flat flexible cables (FFCs) 410 and 420. A timing controller for generating a plurality of data control signals and outputting the data control signal with image data, a level shifter for generating and outputting a plurality of GIP driving signals under control of the timing controller, and driving circuits such as a power management circuit for generating and outputting a plurality of driving voltages required by a display device may be installed on the control PCB 400. The level shifter may be installed on the first and second source PCBs 500 and 510.

The plurality of data driving ICs 310 may receive a plurality of data control signals and image data from the control PCB 400 through the FFCs 410 and 420 and the source PCBs 500 and 510, convert the received image data into an analog data signal, and supply the analog data signal to data lines of the panel 100.

When the panel 100 is an organic light emitting diode (OLED) panel, the plurality of data driving ICs 310 may include a sensing unit for sensing pixel current indicating electrical properties (a threshold voltage and mobility of a driving TFT and a threshold voltage of an OLED device) of each subpixel as current or voltage under control of the timing controller, converting the pixel current into digital sensing data, and supplying the digital sensing data to the timing controller. The timing controller may update a compensation value of each subpixel using the sensing data of each subpixel, received from the plurality of data driving ICs 310. The timing controller may compensate for image data corresponding to each subpixel with a corresponding compensation value to compensate for brightness non-uniformity due to a property difference between subpixels.

Gate transmission signals generated from the level shifter of the control PCB 400 may be transmitted to a first COF 300-1 positioned at one side end through the first FFC 410 and the first source PCB 500 and may be transmitted to a last COF 300-K through the second FFC 420 and the second source PCB 510.

For example, the gate transmission signals may include a plurality of scan clocks that are used as a start pulse, a reset pulse, an alternating current (AC) driving voltage for an odd frame, an AC driving voltage for an even frame, and a scan signal for driving gate lines and may further include a plurality of carry clocks for control of a shift operation of the gate drivers 200 and 210. When the panel 100 is an OLED panel, the gate transmission signals may further include a plurality of sense clocks used as a sense signal for driving sensing gate lines, a line signal used to select gate lines for sensing, and so on.

The first and last COFs 300-1 and 300-K of the plurality of COFs 300 may further include a gate transmission path including the circuit films 320 and the data driving ICs 310 to transmit a plurality of gate transmission signals received from the source PCBs 500 and 510 to the first and second gate drivers 200 and 210 of the panel 100 through the gate transmission path.

In particular, the first and last COFs 300-1 and 300-K may selectively output N gate transmission signals and N data outputs from opposite output units through the data driving IC 310 to remove N unnecessary gate dummy output pads. Accordingly, in the first and last COFs 300-1 and 300-K according to an embodiment of the present disclosure, the number of gate output pads may be reduced to N from 2N corresponding to the related art to reduce a total number of output pads to M+N from M+2N corresponding to the prior art (M being the number of data outputs).

Figure 2:
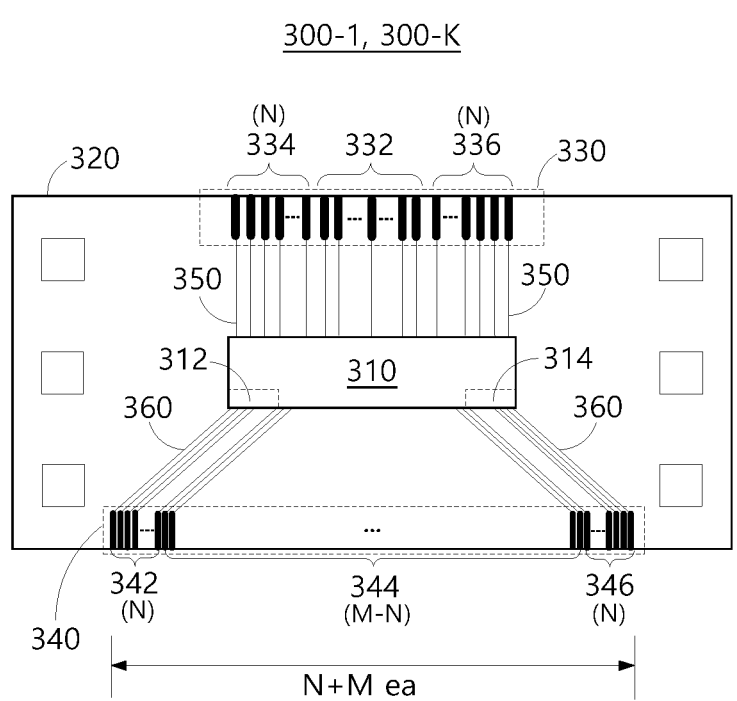
FIG. 2 is a schematic diagram showing a configuration of a COF according to an embodiment of the present disclosure.
Figure 3:
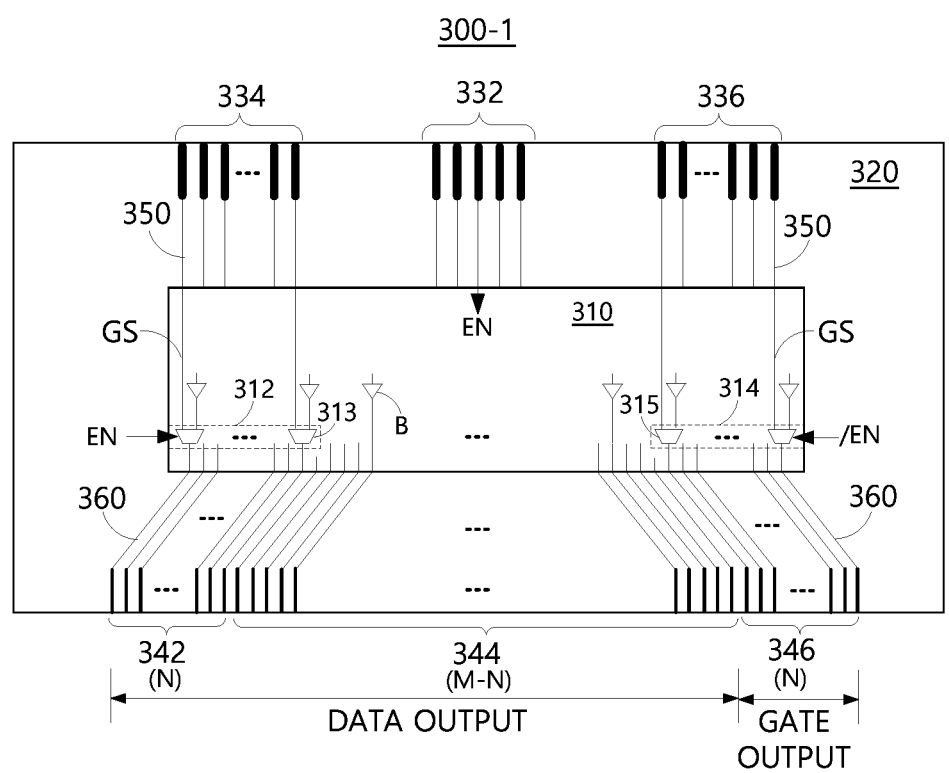
FIG. 3 is a diagram showing output setting of a switchable output applied to a first COF according to an embodiment of the present disclosure.
Figure 4:
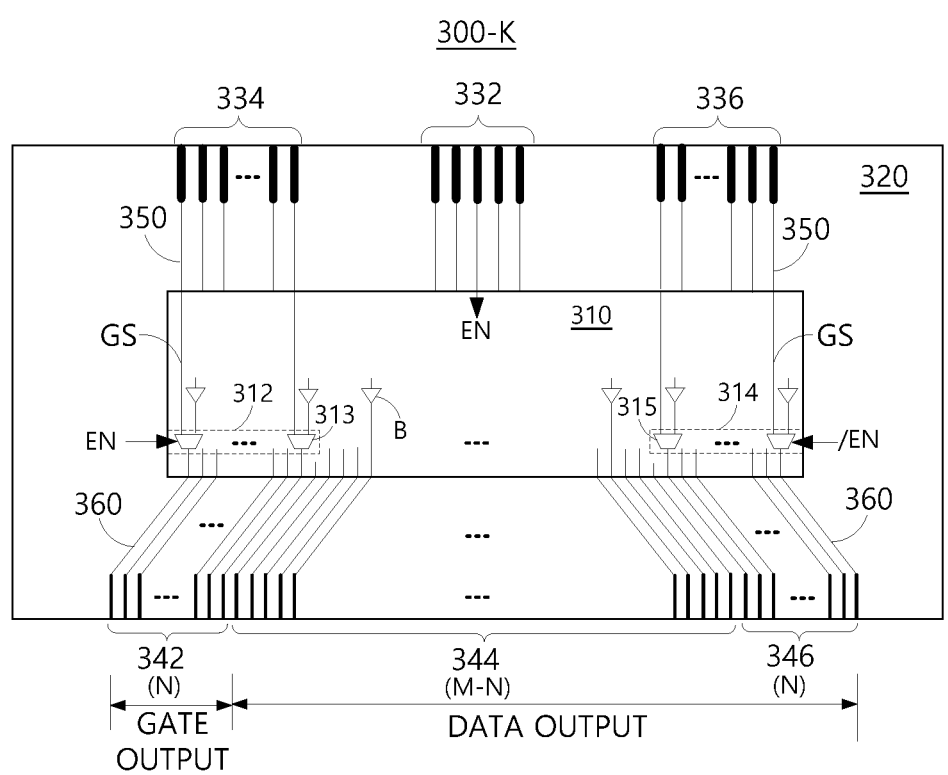
FIG. 4 is a diagram showing output setting of a switchable output applied to a last COF according to an embodiment of the present disclosure.

FIGS. 2 to 4 are schematic diagrams showing a COF structure according to an embodiment of the present disclosure.

Referring to FIGS. 2 to 4, the COFs 300-1 and 300-K each including a gate transmission path according to an embodiment of the present disclosure may include a first pad region 330 of the circuit films 320 bonded and connected to a pad region of the source PCBs 500 and 510, and a second pad region 340 of the circuit films 320 bonded and connected to a pad region of the panel 100. The COFs 300-1 and 300-K each further may include first connection lines 350 for separately connecting pads 332, 334, and 336 of the first pad region 330 to terminals of the data driving ICs 310, and second connection lines 360 for separately connecting terminals of the data driving IC 310 to pads 342, 344, and 346 of the second pad region 340.

The first pad region 330 of the circuit films 320 may include data input pads 332 and gate input pads 334 and 336 that are connected to the source PCB 500 or 510. The data input pads 332 may transmit data transmission signals including image data and data control signals. The gate input pads 334 and 336 may include N gate input pads 334 of a first group and N gate input pads 336 of a second group, for transmitting N gate transmission signals. Depending on a bonding position of the COFs 300-1 and 300-K, only any one group of the gate input pads 334 and 336 of the first and second groups may be connected to the source PCB 500 or 510 and the other group may be a dummy input pad. The N gate input pads 334 of the first group may be arranged at one side of the first pad region 330, the N gate input pads 336 of the second group may be arranged at the other side, and the data input pads 332 may be arranged between the first and second groups 334 and 336. IC output pads (not shown) for transmitting output signals of the data driving IC 310 to the source PCB 500 or 510 may be further arranged in the first pad region 330.

The first connection lines 350 arranged between the first pad region 330 and the data driving IC 310 may separately connect the input pads 332, 334, and 336 of the first pad region 330 and input terminals of the data driving IC 310.

The second connection lines 360 arranged between the data driving IC 310 and the second pad region 340 may separately connect output terminals of the data driving IC 310 to the output pads 342, 344, and 346 of the second pad region 340.

The second pad region 340 of the circuit film 320 may include the output pads 342, 344, and 346 of the first to third groups connected to the panel 100. (M−N) output pads 344 of the second group positioned in a center portion of the second pad region 340 may receive (M−N) data output from the data driving ICs 310 and transmit the data outputs to the panel 100. N output pads 342 of the first group and N output pads 346 of the third group, which are positioned at opposite sides of the second pad region 340, may receive N gate transmission signals or N data outputs through each of first and second switchable output units 312 and 314 installed in the data driving IC 310 and supply the received signals or outputs to the panel 100.

When the first switchable output unit 312 and the output pads 342 of the first group supply N gate transmission signals to the panel 100, the second switchable output unit 314 and the output pads 346 of the third group may supply M data outputs to the panel 100 along with the output pads 344 of the second group.

On the other hand, when the second switchable output unit 314 and the output pads 346 of the third group supply N gate transmission signals to the panel 100, the first switchable output unit 312 and the output pads 342 of the first group may supply M data outputs to the panel 100 along with the output pads 344 of the second group.

Referring to FIGS. 3 and 4, each of the first and second switchable output units 312 and 314 installed in the data driving IC 310 may include multiplexers (MUXs) 313 and 315 for respective output channels, for selectively outputting a gate transmission signal GS and a data output of an output buffer B. The first switchable output unit 312 may be controlled by an enable signal EN and the second switchable output unit 314 may be controlled by a reverse enable signal /EN obtained by inverting the enable signal EN and, thus, the first and second switchable output units 312 and 314 may select and output opposite inputs. The enable signal EN may be received from the timing controller or generated through an option pin of data driving IC 310 set by a user.

The first switchable output unit 312 may include N first MUX 313 controlled by the enable signal EN to select N gate transmission signals GSs received through the gate input pads 334 of the first group and to output the N gate transmission signals GSs to the output pads 342 of the first group or to select N data outputs received from N output buffers Bs and to output the N data outputs to the output pads 342 of the first group.

The second switchable output unit 314 may include N second MUXs controlled by the reverse enable signal /EN to select N gate transmission signals GSs received through the gate input pads 336 of the second group and to output the N gate transmission signals GSs to the output pads 346 of the third group or to select N data outputs received from N output buffers Bs and to output the N data outputs to the output pads 346 of the third group.

Referring to FIGS. 1 and 3, the first COF 300-1 bonded to one-side portion of the pad region of the panel 100 in the X-axis direction may select N data outputs through the first switchable output unit 312 and output the N data outputs to the output pads 342 of the first group and may select N gate transmission signal GSs and output the N gate transmission signals GSs to the output pads 346 of the third group through the second switchable output unit 314. Accordingly, the first COF 300-1 may supply M data outputs to the panel 100 through the M output pads 342 and 344 of the first and second groups and supply N gate transmission signals to the first gate driver 200 of the panel 100 through the N output pads 346 of the third group.

Referring to FIGS. 1 and 4, the last COF 300-K bonded to the other side portion of the pad region of the panel 100 in the X-axis direction may select N gate transmission signals GSs and output the N gate transmission signals GSs to the output pads 342 of the first group through the first switchable output unit 312 and may select N data outputs and output the N data outputs to the output pads 346 of the third group through the second switchable output unit 314. Accordingly, the last COF 300-K may supply M data outputs to the panel 100 through the M output pads 346 and 344 of the third group and the second group and supply N gate transmission signals to the second gate driver 210 of the panel 100 through the N output pads 342 of the first group.

As such, the first and last COFs 300-1 and 300-K each according to an embodiment of the present disclosure may selectively output N gate transmission signals and N data outputs through the first and second switchable output units 312 and 314 installed in the data driving IC 310 to remove N gate dummy output pads compared with the prior art and, thus, a total number of output pads may be reduced to M+N from M+2N, corresponding to the related art.

Figure 5:
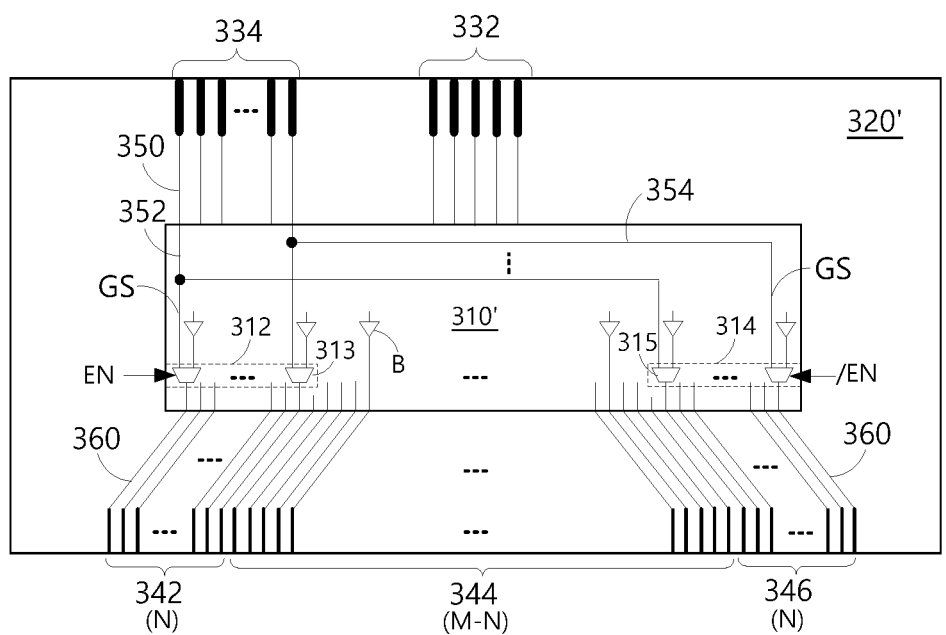
FIG. 5 is a schematic diagram showing a configuration of a COF according to another embodiment of the present disclosure.

FIG. 5 is a schematic diagram showing a configuration of a COF according to another embodiment of the present disclosure.

Referring to FIG. 5, the COF structure is configured in such a way that gate transmission lines 352 and 354 that are connected to the N gate input pads 334 of the first group through the first connection lines 350 and positioned in a data driving IC 310' are branched in the data driving IC 310'. Accordingly, the first switchable output unit 312 may be connected to the input pads 334 of the first group through the N gate transmission lines 352 of the first group and the second switchable output unit 314 may be connected to the input pads 334 of the first group through the N gate transmission lines 354 of the second group, branched from the first group 352.

Accordingly, compared with FIG. 2, the N gate input pads 336 of the second group shown in FIG. 2 may be further excluded from the COFs 300-1 and 300-K shown in FIG. 5 and, thus, the number of the gate input pads 334 may also be reduced to N from 2N.

Figure 6:
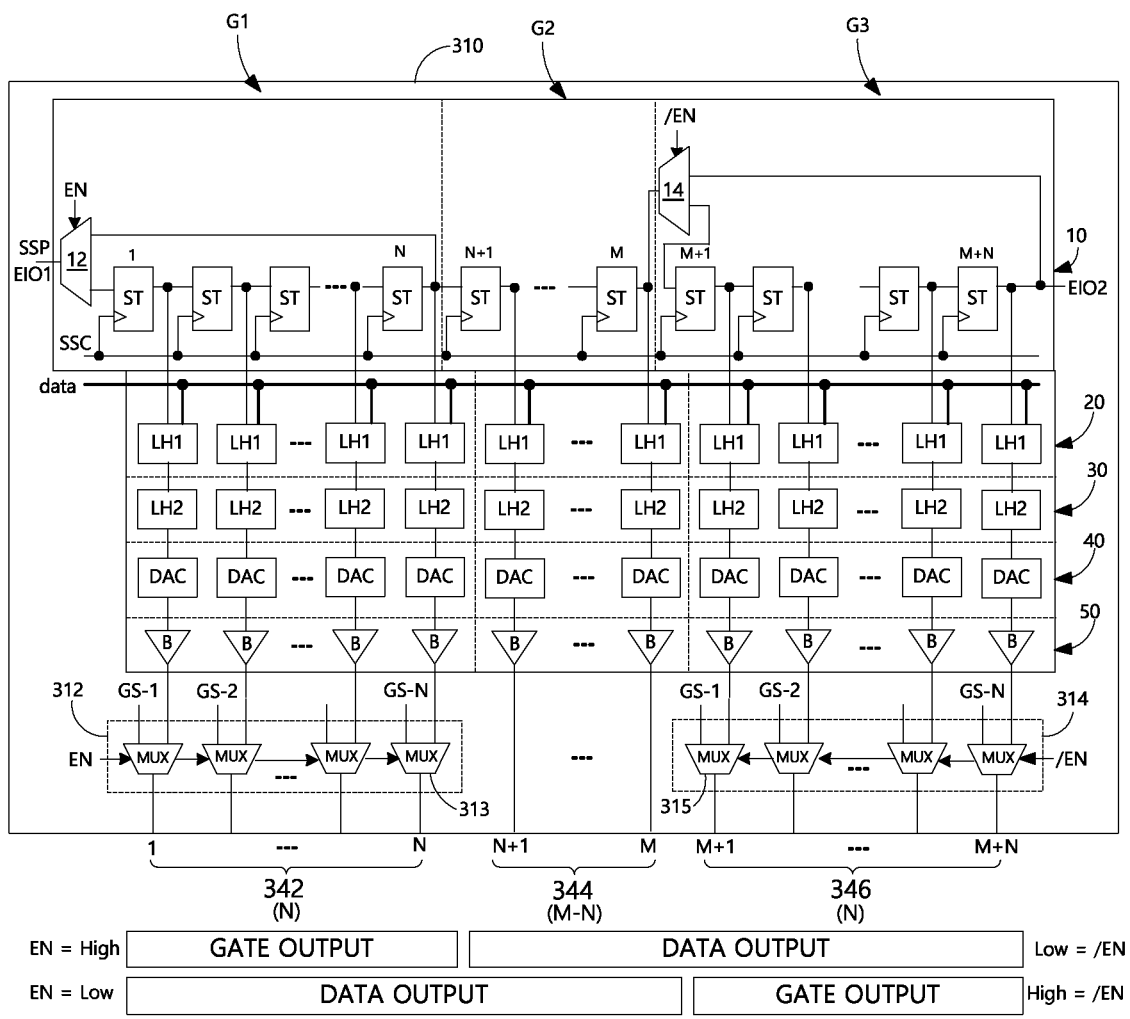
FIG. 6 is a circuit block showing an internal configuration of data driving ICs according to an embodiment of the present disclosure.

FIG. 6 is a circuit block showing an internal configuration of the data driving IC 310 with a gate transmission path installed therein according to an embodiment of the present disclosure.

Referring to FIG. 6, the data driving IC 310 with a gate transmission path installed therein may include a shift register 10, a first latch array 20, a second latch array 30, a digital/analog converter (hereinafter referred to as a DAC) array 40, an output buffer array 50, and the first and second switchable output units 312 and 314.

The shift register 10 may include (M+N) stages ST1 to ST(M+N), may input a source start pulse SSP or a carry output EIO1 received from a previous-end data driving IC as a latch start pulse, and may sequentially output M sampling signals while shifting the latch start pulse according to a source shift clock SSC.

To select M channels of the (M+N) stages STs, the shift register 10 may further include a first demultiplexer (hereinafter referred to as a DEMUX) 12 controlled by an enable signal EN and a second DEMUX 14 controlled by the reverse enable signal /EN.

The first DEMUX 12 may supply the latch start pulse SSP or EIO1 to the first stage ST1 of the first group G1 or the $(N+1)^{th}$ stage ST(N+1) of the second group G2 (e.g., first stage of the second group G2) in response to the enable signal EN. The second DEMUX 14 may output a sampling signal of the $M^{th}$ stage ST(M) of the second group G2 (e.g., last stage of the second group G2) as a carry output EIO2 for latch start of a next-end data driving IC in response to the reverse enable signal /EN or may supply the sampling signal to the $(M+1)^{th}$ stage ST(M+1) of the third group G3 (e.g., first stage of the third group G3). Accordingly, a stage with M channels to the $M^{th}$ stage ST(M) from the first stage ST1 of the first and second groups G1 and G2 may perform a shift operation by the first and second DEMUXs 12 and 14 or a stage with M channels to the $(M+N)^{th}$ stage ST(M+N) from $(N+1)^{th}$ stages ST(N+1) of the second and third groups G2 and G3 may perform a shift operation to sequentially output M sampling signals.

The first latch array 20 may include first latches LH1 of (M+N) channels and the second latch array 30 may include second latches LH2 of (M+N) channels. The first latches LH1 of the first and second groups G1 and G2, which receive M sampling signals from the first and second groups G1 and G2 of the shift register 10, may sequentially sample and latch M pixel data and, then, may simultaneously output the M pixel data through the second latches LH2 of M channels of the first and second groups G1 and G2. The first latches LH1 of the second and third groups G2 and G3, which receive M sampling signals from the second and third groups G2 and G3 of the shift register 10, may sequentially sample and latch M pixel data and, then, may simultaneously output the M pixel data through the second latches LH2 of M channels of the second and third groups G2 and G3.

The DAC array 40 may include DACs of (M+N) channels and the output buffer array 50 may include output buffers of (M+N) channels. The DAC array 40 may convert pixel data of M channels, received from the second latch array 30, into an analog data voltages using grayscale voltages obtained by subdividing reference gamma voltages and output the analog data voltages through the output buffers Bs of M channels. DACs of the first and second groups G1 and G2 may convert pixel data received from the second latches LH2 of the first and second groups G1 and G2 into analog data voltages and output the analog data voltages to the output buffers Bs of the first and second groups G1 and G2. DACs of the second and third groups G2 and G3 may convert pixel data received from the second latches LH2 of the second and third groups G2 and G3 into analog data voltages and output the analog data voltages to output buffers Bs of the second and third groups G2 and G3.

The first switchable output unit 312 may include the first MUX 313 controlled by the enable signal EN to select N gate transmission signals GS-1 to GS-N received from the source PCB 500 or 510 and to output the N gate transmission signals GS-1 to GS-N to the output pads 342 of the first group or to select N data outputs of the first group, received from N output buffers Bs of the first group G1, and to output the N data outputs to the output pads 342 of the first group.

The second switchable output unit 314 may include the N second MUX 315 controlled by the reverse enable signal /EN to select N gate transmission signals GSs received from the source PCB 500 or 510 and to output the N gate transmission signals GSs to the output pads 346 of the third group or to select N data outputs of the third group, received from the N output buffers Bs of the third group G3, and to output the N data outputs to the output pads 346 of the third group.

(M−N) output buffers of the second group G2, arranged between the first and third groups, may output (M−N) data outputs of the second group to the output pads 344 of the second group.

For example, when the enable signal EN is high and the reverse enable signal /EN is low, the first switchable output unit 312 may select and output the N gate transmission signals GS-1 to GS-N and, thus, the output pads 342 of the first group may output the N gate transmissions signals GS-1 to GS-N to the panel 100. The stages ST(N+1) to ST(M+N) of the $(N+1)^{th}$ to $(M+N)^{th}$ channels of the second and third groups G2 and G3 may output M sampling signals according to control of the first and second DEMUXs 12 and 14 and, thus, M pixel data may be output through the latches LH1 and LH2 and DACs of the $(N+1)^{th}$ to $(M+N)^{th}$ channels and the output buffers Bs of the second and third groups G2 and G3 and, in addition, the second switchable output unit 314 may select and output N pixel data output from the N output buffers Bs of the third group G3 and, thus, the output pads 344 and 346 of the second and third groups may output M pixel data to the panel 100.

When the enable signal EN is low and the reverse enable signal /EN is high, the second switchable output unit 314 may select and output the N gate transmission signals GS-1 to GS-N and, thus, the output pads 346 of the third group may output the N gate transmission signals GS-1 to GS-N to the panel 100. The stages ST1 to ST(M) of the first to $M^{th}$ channels of the first and second groups G1 and G2 may output M sampling signals according to control of the first and second DEMUXs 12 and 14 and, thus, M pixel data may be output through the latches LH1 and LH2 and the DAC of the first to $M^{th}$ channels and the output buffers Bs of the first and second groups G1 and G2 and, in addition, the first switchable output unit 312 may select and output N pixel data output from N output buffers B of the first group G1 and, thus, the output pads 342 and 344 of the first and second groups may output M pixel data to the panel 100.

Figure 7:
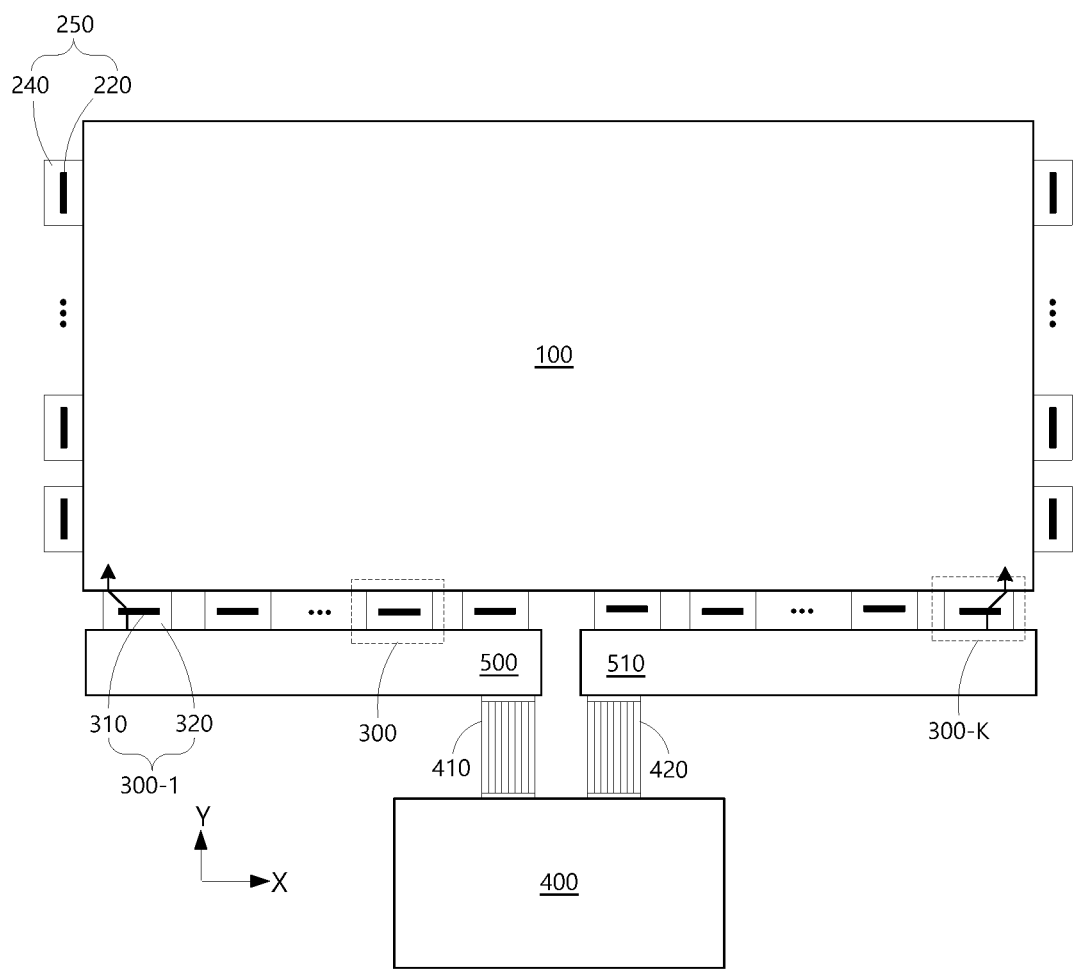
FIG. 7 is a schematic system configuration diagram showing a configuration of a display device according to another embodiment of the present disclosure.

FIG. 7 is a schematic system configuration diagram showing a configuration of a display device according to another embodiment of the present disclosure.

The display device shown in FIG. 7 is different from the display device shown in FIG. 1 only in that the gate drivers 200 and 210 include the plurality of gate ICs 220 and, thus, a description of the repeated components of FIG. 7 is omitted herein.

A plurality of gate COFs 250 in which the plurality of gate ICs 220 are respectively installed on the plurality of circuit films 240 may be bonded and connected to opposite sides or one-side portion of the panel 100 via ACF.

Gate transmission signals generated from a timing controller of the control PCB 400 may be transmitted to the first COF 300-1 positioned at one-side end through the first FFC 410 and the first source PCB 500 and may be transmitted to the last COF 300-K positioned at the other-side end through the second FFC 420 and the second source PCB 510.

As described above with reference to FIGS. 2 to 6, the first and last COFs 300-1 and 300-K each may further include a gate transmission path including the circuit film 320 and the data driving IC 310 and supply a plurality of gate transmission signals received from the source PCB 500 or 510 to the panel 100 through a gate transmission path. The panel 100 may supply a plurality of gate transmission signals to the gate IC 220 on the gate COF 250 through a transmission path.

As shown in FIGS. 2 to 6, the first and last COFs 300-1 and 300-K each may selectively output N gate transmission signals and N data outputs from opposite output units through the data driving IC 310 to remove N unnecessary gate dummy output pads. Accordingly, the first and last COFs 300-1 and 300-K each may reduce the number of gate output pads to N from 2N corresponding to the related art to reduce a total number of output pads to M+N from M+2N (M being the number of data outputs) corresponding to the related art.

As such, a COF according to an embodiment of the present disclosure may selectively output gate transmission signals and data outputs using a switchable output unit in a driving IC to remove a gate dummy pad, thereby reducing the number of output pads.

Accordingly, even if a horizontal width of a COF is not increased, a pitch of an input pad may be stably ensured and, thus, misalignment error during the bonding process of a COF and a PCB may be minimized and manufacturing costs may be reduced.

To overcome misalignment error of a COF and a source PCB, it is not required to divide each of two source PCBs into a plurality of pieces and, thus, bonding and assembly processes are easily performed, thereby reducing tack time and manufacturing costs.

A COF according to an embodiment of the present disclosure may be applied to any display device such as an OLED display device and an LCD.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A chip on film comprising:
    data input pads and gate input pads that are connected to a data driving integrated circuit (IC) and arranged in a first pad region of a circuit film; and
    first to third groups of output pads that are connected to the data driving IC and arranged in a second pad region of the circuit film,
    wherein the data driving IC comprises:
    first to third groups of output buffers,
    a first switchable output unit configured to selectively supply a plurality of gate transmission signals received from the gate input pads and an output of the first group of output buffers to the first group of output pads, and
    a second switchable output unit configured to selectively supply the plurality of gate transmission signals and an output of the third group of output buffers to the third group of output pads; and
    wherein an output of the second group of output buffers is supplied to the second group of output pads arranged between the first group of output pads and the third group of output pads,
    wherein the first switchable output unit comprises a first group of multiplexers (MUXs) configured to select the plurality of gate transmission signals or select the output of the first group of output buffers in response to an enable signal and to supply the selected signals or the output of the first group of output buffers to the first group of output pads; and
    wherein the second switchable output unit comprises a second group of MUXs configured to select the plurality of gate transmission signals or select the output of the third group of output buffers in response to a reverse enable signal obtained by inverting the enable signal and to output the selected signals or the output of the third group of output buffers to the third group of output pads.

2. The chip on film of claim 1, wherein, when the first switchable output unit selects the plurality of gate transmission signals and supplies the selected signals to the first group of output pads, the second switchable output unit selects the output of the third group of output buffers, and the second group of the output buffers and the third group of the output buffers output data through the output pads of the second group and the third group respectively or, when the second switchable output unit selects the plurality of gate transmission signals and supplies the selected signals to the third group of output pads, the first switchable output unit selects the output of the first group of output buffers, and the first group of output buffers and the second group of output buffers output data through the first group of output pads and the second group of output pads respectively.

3. The chip on film of claim 1, wherein the data driving IC comprises:
    first to third groups of digital/analog converters (DACs) connected to the first to third groups of output buffers for respective channels;
    first to third groups of latches connected to the first to third groups of DACs for respective channels; and
    a shift register comprising first to third groups of stages connected to the first to third groups of latches for respective channels to supply a sampling signal; and
    wherein the shift register further comprises:
    a first demultiplexer (DEMUX) configured to supply a latch start pulse to a first stage of the first group of stages or a first stage of the second group of stages in response to the enable signal; and
    a second DEMUX configured to output a sampling signal of a last stage of the second group of stages to a next-end data driving IC as a carry output or supply the sampling signal to a first stage of the third group of stages in response to the reverse enable signal.

4. The chip on film of claim 3, wherein, when the first switchable output unit supplies the plurality of gate transmission signals to the first group of output pads, the second group of stages and the third group of stages perform a shift operation according to control of the first and the second DEMUXs to latch pixel data to the second group of latches and the third group of latches and to supply the latched pixel data to the second group of output pads and the third group of output pads through the second group of DACs and the third group of DACs and the second group of output buffers and the third group of output buffers respectively.

5. The chip on film of claim 3, wherein, when the second switchable output unit supplies the plurality of gate transmission signals to the third group of output pads, the first group of stages and the second group of stages perform a shift operation according to control of the first and the second DEMUXs to latch pixel data to the first and the second groups of latches and to supply the latched pixel data to the first and the second groups of output pads through the first and the second groups of DACs and the first and the second groups of the output buffers respectively.

6. The chip on film of claim 1, wherein the gate input pads comprise at least one group of a first group of gate input pads positioned outside one side of the data input pads and a second group of gate input pads positioned outside another side of the data input pads; and wherein the first switchable output unit is connected to the first group of gate input pads and the second switchable output unit is connected to the second group of gate input pads or the first and the second switchable output units are commonly connected to any one group of the first group of gate input pads and the second group of gate input pads through an input terminal of the data driving IC.

7. A display device comprising:
a panel comprising a pixel array;
first and second gate drivers connected to opposite sides of the panel to drive gate lines of the pixel array; and
a plurality of chips on film in which a plurality of data driving ICs for driving data lines of the pixel array are respectively installed on a plurality of circuit films and which are connected between the panel and a printed circuit board (PCB),
wherein a first chip on film connected to the first gate driver of the plurality of chips on film and a second chip on film connected to the second gate driver transmit a plurality of gate transmission signals,
wherein the first chip on film and the second chip on film each includes:
data input pads and gate input pads that are connected to any one of the data driving ICs and arranged in a first pad region of a circuit film; and
first to third groups of output pads that are connected to the any one data driving IC and arranged in a second pad region of the circuit film,
wherein the any one data driving IC comprises first to third groups of output buffers, a first switchable output unit configured to selectively supply the plurality of gate transmission signals received from the gate input pads and an output of the first group of output buffers to the first group of output pads, and a second switchable output unit configured to selectively supply the plurality of gate transmission signal and an output of the third group of output buffers to the third group of output pads; and
wherein an output of the second group of output buffers is supplied to the second group of output pads arranged between the first group of output pads and the third group of output pads,
wherein the first switchable output unit comprises a first group of multiplexers (MUXs) configured to select the plurality of gate transmission signals or select the output of the first group of output buffers in response to an enable signal and to supply the selected signals or the output of the first group of output buffers to the first group of output pads; and
wherein the second switchable output unit comprises a second group of MUXs configured to select the plurality of gate transmission signals or select the output of the third group of output buffers in response to a reverse enable signal obtained by inverting the enable signal and to output the selected signals or the output of the third group of output buffers to the third group of output pads.

8. The display device of claim 7, wherein, when the first switchable output unit selects the plurality of gate transmission signals and supplies the selected signals to the first group of output pads, the second switchable output unit selects the output of the third group of output buffers, and the second group of output buffers and the third group of output buffers output data through the output pads of the second group and the third group respectively or, when the second switchable output unit selects the plurality of gate transmission signals and supplies the selected signals to the third group of output pads, the first switchable output unit selects the output of the first group of output buffers, and the first group of output buffers and the second group of output buffers output data through the first group of output pads and the second group of output pads respectively.

9. The display device of claim 7, wherein the any one data driving IC comprises:
first to third groups of digital/analog converters (DACs) connected to the output buffers of the first to third groups for respective channels;
first to third groups of latches connected to the first to third groups of DACs for respective channels; and
a shift register comprising first to third groups of stages connected to the first to third groups of latches for respective channels to supply a sampling signal; and
wherein the shift register further comprises:
a first demultiplexer (DEMUX) configured to supply a latch start pulse to a first stage of the first group of stages or a first stage of the second group of stages in response to the enable signal; and
a second DEMUX configured to output a sampling signal of a last stage of the second group of stages to a next-end data driving IC as a carry output or supply the sampling signal to a first stage of the third group of stages in response to the reverse enable signal.

10. The display device of claim 9, wherein, when the first switchable output unit supplies the plurality of gate transmission signals to the first group of output pads, the second group of stages and the third group of stages perform a shift operation according to control of the first and the second DEMUXs to latch pixel data to the second group of latches and the third group of latches and to supply the latched pixel data to the second and third groups of output pads through the second and third groups of DACs and the second and third group of output buffers respectively.

11. The display device of claim 9, wherein, when the second switchable output unit supplies the plurality of gate transmission signals to the third group of output pads, the first and the second groups of stages perform a shift operation according to control of the first and the second DEMUXs to latch pixel data to the first and the second groups of latches and to supply the latched pixel data to the first and the second groups of output pads through the first and the second groups of DACs and the first and the second groups of output buffers respectively.

12. The display device of claim 7, wherein the gate input pads comprise at least one group of a first group of gate input pads positioned outside one side of the data input pads and a second group of gate input pads positioned outside another side of the data input pads; and
wherein the first switchable output unit is connected to the first group of gate input pads and the second switchable output unit is connected to the second group of gate input pads or the first and the second switchable output units are commonly connected to any one group of the first group of gate input pads and the second group of gate input pads through an input terminal of the any one data driving IC.

13. The display device of claim 7, wherein each of the first and the second chip on films is connected to the PCB through the first pad region and is connected to the panel through the second pad region; and
wherein the first and the second gate drivers are installed in the panel or are configured with a plurality of gate chips on film with a plurality of gate driving ICs separately installed thereon to be connected to the panel.

14. A chip on film comprising:
a first group of output pads,
a second group of output pads, and
a third group of output pads,
wherein when the first group of output pads output a plurality of gate transmission signals to be provided to a gate driver of a display device, the second group of output pads and the third group of output pads output a plurality of data signals to be provided to a plurality of data lines of the display device in response to an enable signal, and
wherein when the third group of output pads output the plurality of gate transmission signals, the first group of output pads and the second group of output pads output the plurality of data signals in response to a reverse enable signal, the reverse enable signal being the enable signal inverted.

15. The chip on film of claim 14, further comprising:
a plurality of data input pads configured to receive image data, and
a plurality of gate input pads configured to receive the plurality of gate transmission signals.

16. The chip on film of claim 15, wherein the plurality of data signals is the received image data converted to analog data signals.

* * * * *